(12) United States Patent
Ishii

(10) Patent No.: US 8,416,462 B2
(45) Date of Patent: Apr. 9, 2013

(54) INFORMATION PROCESSING APPARATUS, METHOD, PROGRAM, AND STORAGE MEDIUM

(75) Inventor: Masaki Ishii, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 688 days.

(21) Appl. No.: 11/976,415

(22) Filed: Oct. 24, 2007

(65) Prior Publication Data

US 2009/0103137 A1    Apr. 23, 2009

(30) Foreign Application Priority Data

Oct. 24, 2006   (JP) ................................ 2006-289053

(51) Int. Cl.
*H04N 5/225*   (2006.01)
(52) U.S. Cl. ..................... 358/3.28; 358/1.17; 358/1.15; 358/1.4; 382/100; 382/195; 713/176
(58) Field of Classification Search .................. 358/1.17, 358/3.28, 401, 1.15; 382/100, 195, 232; 713/176
See application file for complete search history.

(56) References Cited

U.S. PATENT DOCUMENTS

| | | | |
|---|---|---|---|
| 5,386,303 A | 1/1995 | Kihara | |
| 6,738,491 B1 * | 5/2004 | Ikenoue et al. | 382/100 |
| 6,968,397 B1 * | 11/2005 | Kanamoto | 709/250 |
| 7,216,368 B2 * | 5/2007 | Ishiguro | 726/32 |
| 7,571,323 B2 * | 8/2009 | Iwamura et al. | 713/176 |
| 2002/0095579 A1 * | 7/2002 | Yoshiura et al. | 713/176 |
| 2004/0044894 A1 * | 3/2004 | Lofgren et al. | 713/176 |
| 2006/0007500 A1 * | 1/2006 | Abe et al. | 358/401 |

FOREIGN PATENT DOCUMENTS

| | | |
|---|---|---|
| JP | 06-231466 | 8/1994 |
| JP | 2003-101762 | 4/2003 |
| JP | 2003-283797 | 10/2003 |
| JP | 2004-58410 A | 2/2004 |
| JP | 2004-080136 | 3/2004 |
| JP | 2004-206636 A | 7/2004 |
| JP | 2004-336219 | 11/2004 |
| JP | 2006-238119 | 9/2006 |

* cited by examiner

*Primary Examiner* — King Poon
*Assistant Examiner* — Allen H Nguyen
(74) *Attorney, Agent, or Firm* — Dickstein Shapiro LLP

(57) ABSTRACT

An information processing apparatus includes a first information acquisition unit, a second information acquisition unit, a third information acquisition unit, and an information embedder. The first information acquisition unit obtains target information. The second information acquisition unit obtains given information to be embedded in the target information. The third information acquisition unit obtains control information for accessing the given information. The information embedder generates embed information from the given information and the control information and embeds the embed information in the target information.

18 Claims, 15 Drawing Sheets

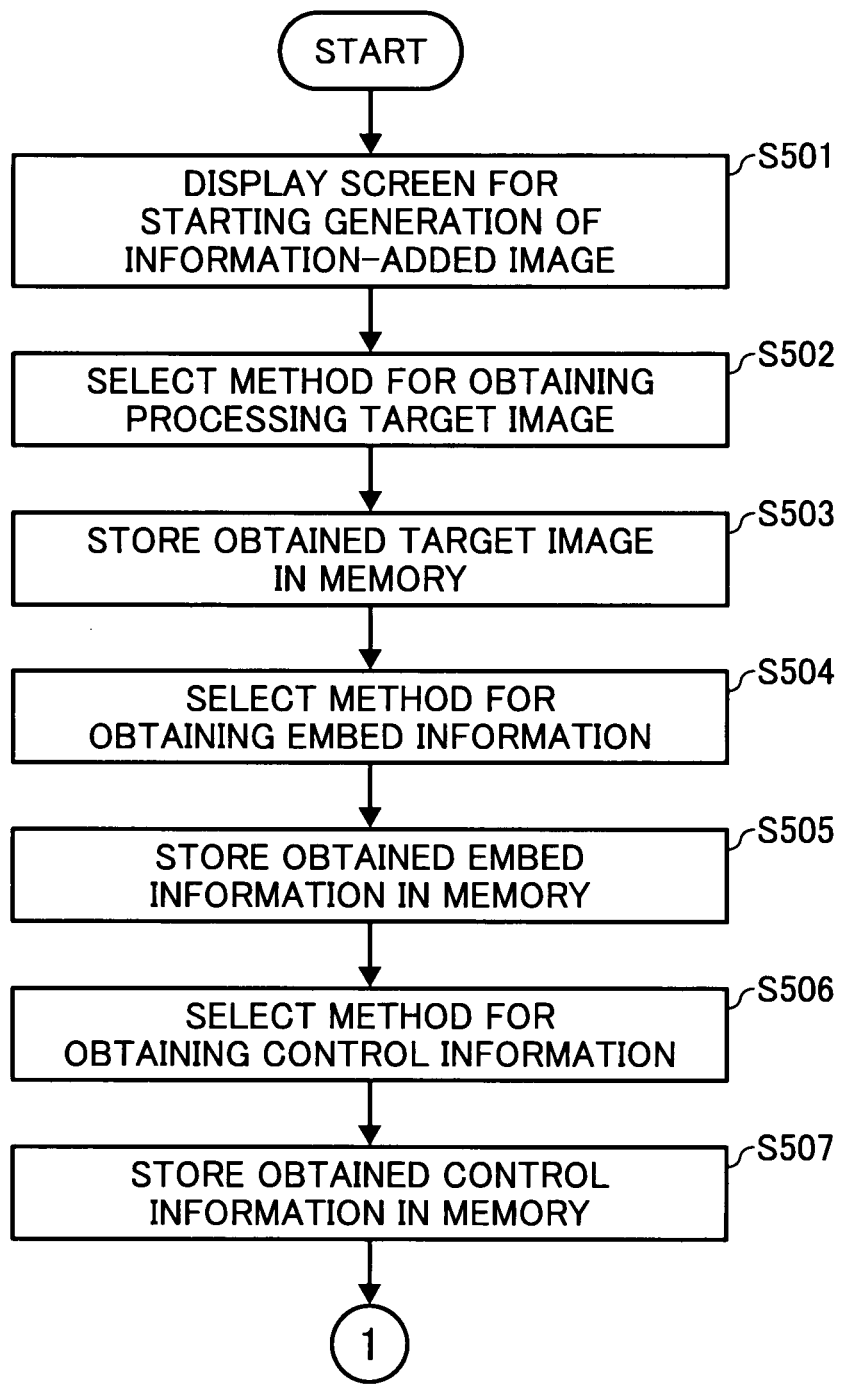

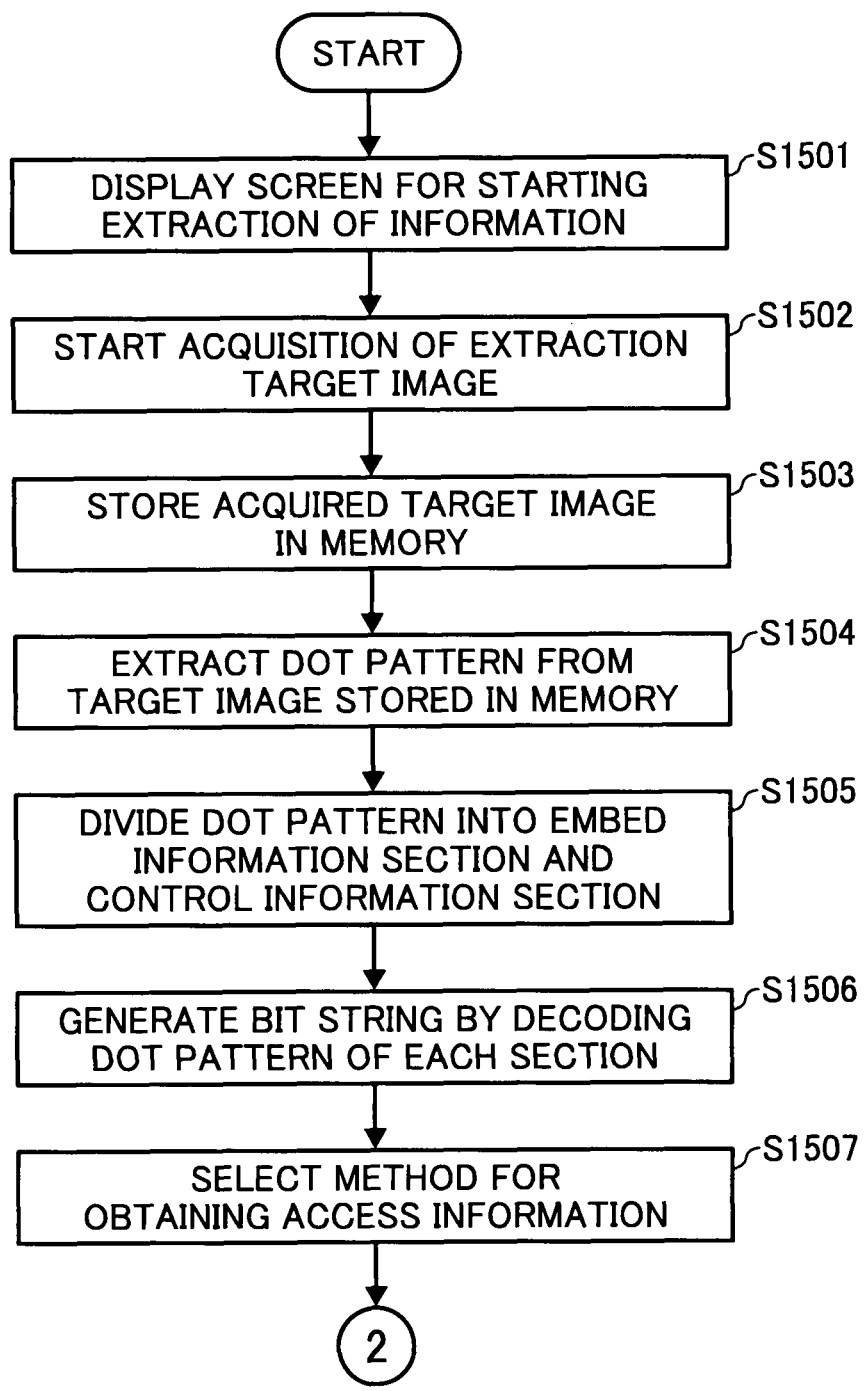

INFORMATION PROCESSING APPARATUS, METHOD, PROGRAM, AND STORAGE MEDIUM

CROSS-REFERENCE TO RELATED APPLICATION

The present patent application claims priority under 35 U.S.C. §119 from Japanese Patent Application No. 2006-289053, filed on Oct. 24, 2006 in the Japan Patent Office, the entire contents of which are hereby incorporated herein by reference.

BACKGROUND OF THE INVENTION

1. Field of the Invention

The following disclosure relates generally to an information processing apparatus, method, and program, and a storage medium storing the program for causing a computer to execute the method, each capable of enhancing the security of additional information embedded in printed material.

2. Description of the Related Art

Technologies have been and are proposed for providing added value to a printed document by embedding additional information into the printed document, that is, information that is in addition to the original contents thereof. For example, one conventional technology is known that embeds additional information in a printed document by drawing a bar code or unnoticeable pattern on the background thereof. Such additional information (hereinafter, embed information) may be, for example, the creator name of the document, the name of a person printing the document, information indicating the presence or absence of authorization to reproduce the document, and/or document print date and time.

As another conventional technology, an image processing apparatus is proposed to form an information-added image by generating a dot pattern image as embed information and adding the dot pattern image to an original image. The embed information expressed in the form of the dot pattern image includes control information regarding the authorization to reproduce the original image. Thus, the creator of the original image can control reproduction of a printed document output from the image processing apparatus. As a result, the creator may prevent the original image from being reproduced against his will.

For the above-described conventional technology, the embed information in the printed document is used to control an operation of the image processing apparatus in order to authorize or prohibit reproduction of the printed document. However, the conventional technology provides no mechanism for controlling access to and reading of the embed information. As a result, anyone having the printed document can access the embed information and thus the security thereof may be compromised.

For example, only topics for discussion in an office meeting are written on a printed document and the results of a discussion thereof may be embedded as the embed information. However, with the above-described conventional technology, anyone having the printed document can access the embed information as described above. Consequently, such confidential information as the results of the discussion might be leaked to the outside if the document is stolen or lost.

SUMMARY OF THE INVENTION

In light of the above-described situation, exemplary embodiments of the present invention provide an information processing apparatus, method, program, and storage medium storing the computer program for causing a computer to execute the method, each capable of enhancing the security of additional information embedded in printed material besides the original contents thereof.

In an exemplary embodiment of the present invention, an information processing apparatus includes a first information acquisition unit, a second information acquisition unit, a third information acquisition unit, and an information embedder. The first information acquisition unit obtains target information. The second information acquisition unit obtains given information to be embedded in the target information. The third information acquisition unit obtains control information for accessing the given information. The information embedder generates embed information from the given information and the control information and embeds the embed information in the target information.

Additional features and advantages will be more fully apparent from the following detailed description, the accompanying drawings, and the associated claims.

BRIEF DESCRIPTION OF THE DRAWINGS

A more complete appreciation of the subject matter of this invention and many of the attendant advantages thereof will be readily obtained as the same becomes better understood by reference to the following detailed description when considered in connection with the accompanying drawings, wherein:

FIGS. 5A and 5B are flowcharts illustrating a procedure for generating an information-added image in an information processing apparatus according to an exemplary embodiment of the present invention;

FIGS. 15A and 15B are flowcharts illustrating a procedure for extracting embed information in an information processing apparatus according to an exemplary embodiment of the present invention;

DETAILED DESCRIPTION OF THE INVENTION

Figure 1:
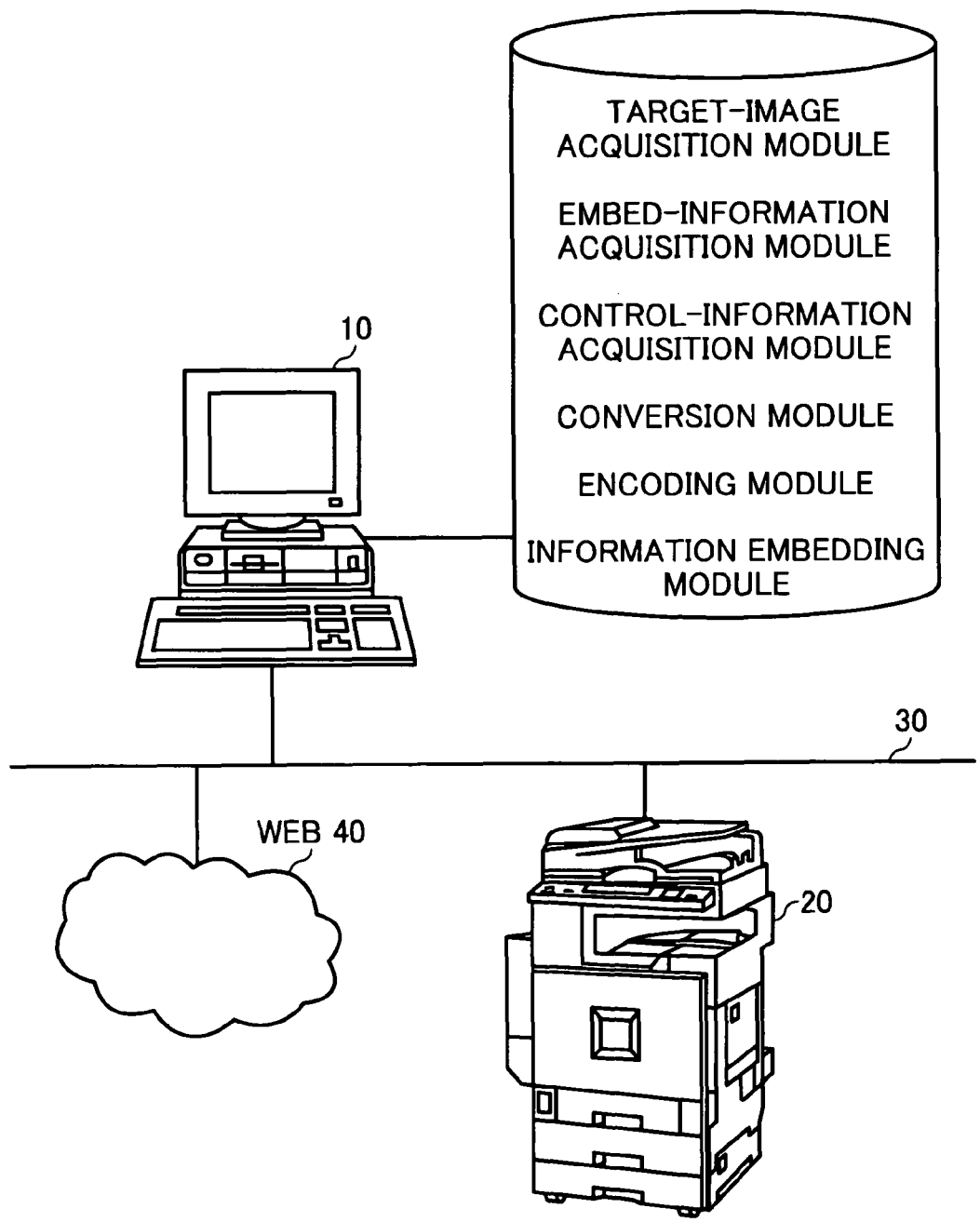
FIG. 1 illustrates a configuration of a system including an information processing apparatus according to an exemplary embodiment of the present invention.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. For the sake of simplicity, the same reference numerals are used in the drawings and the descriptions for the same materials and constituent parts having the same functions, and descriptions thereof are omitted unless otherwise stated.

Exemplary embodiments of the present invention are now described below with reference to the accompanying drawings. It should be noted that, in a later-described comparative example, exemplary embodiment, and alternative example, the same reference numerals are used for the same constituent elements such as parts and materials having the same functions, and redundant descriptions thereof omitted.

FIG. 1 illustrates a configuration of a system including an information processing apparatus according to an exemplary embodiment of the present invention. In this particular exemplary embodiment, a personal computer (PC) 10 and a multifunctional copier 20 are described as examples of information processing apparatuses. In this particular system configuration, the PC 10, the multifunctional copier 20, and a Web 40 are connected to one another via a network 30.

The PC 10 typically includes a central processing unit (CPU), a read-only memory (ROM), a random access memory (RAM), a hard disk drive (HDD), an input-and-output (I/O) unit, and a communication unit, which are not illustrated in FIG. 1. As illustrated in FIG. 1, a processing-target-image acquisition module, an embed-information acquisition module, a control-information acquisition module, a conversion module, an encoding module, and an information embedding module may be stored as programs in the HDD of the PC 10 or on a removable storage medium, for example, a diskette, an optical disk, or the like. The CPU executes each module, if needed, in conjunction with other components of the PC 10.

The multifunctional copier 20 typically includes a scanner unit, a printer unit, a CPU, a ROM, a RAM, a HDD, an I/O unit, and a communication unit, which are not illustrated in FIG. 1. In this exemplary embodiment, as described above, the multifunction copier 20 is configured as an information processing apparatus.

It should be noted that an information processing apparatus according to an exemplary embodiment of the present invention is not limited to the PC or multifunctional copier as described above, but may be a digital camera, another type of multifunctional device having a combination of functions of, for example, a copier, a printer, a scanner, and a facsimile machine, or any other apparatus capable of executing the above-described modules.

The network 30 allows the PC 10 and the multifunctional copier 20 to communicate with each other via the communication units. The network 30 also allows the PC 10 and the multifunctional copier 20 to communicate with other PCs via the Web 40.

Figure 2:
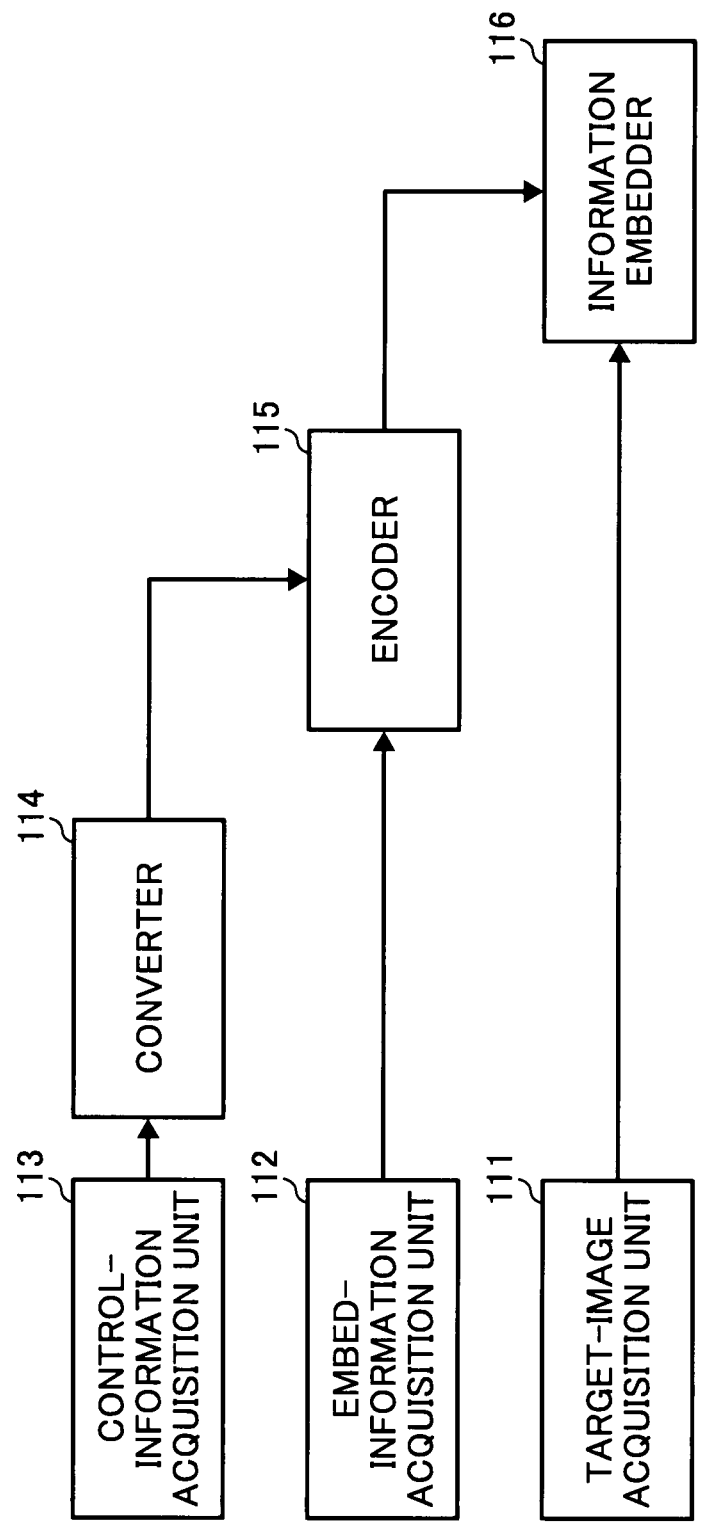
FIG. 2 is a functional block diagram of components employed when embed information is generated in an information processing apparatus according to an exemplary embodiment.

The processing-target-image acquisition module, the embed-information acquisition module, the control-information acquisition module, the conversion module, the encoding module, and the information embedding module of FIG. 1 correspond to a processing-target-image acquisition unit 111, an embed-information acquisition unit 112, a control-information acquisition unit 113, a converter 114, an encoder 115, and an information embedder 116, respectively, illustrated in FIG. 2.

FIG. 2 is a functional block diagram of components for generating embed information in an information processing apparatus according to an exemplary embodiment. As illustrated in FIG. 2, the information processing apparatus may include the processing-target-image acquisition unit 111, the embed-information acquisition unit 112, the control-information acquisition unit 113, the converter 114, the encoder 115, and the information embedder 116.

Figure 3:
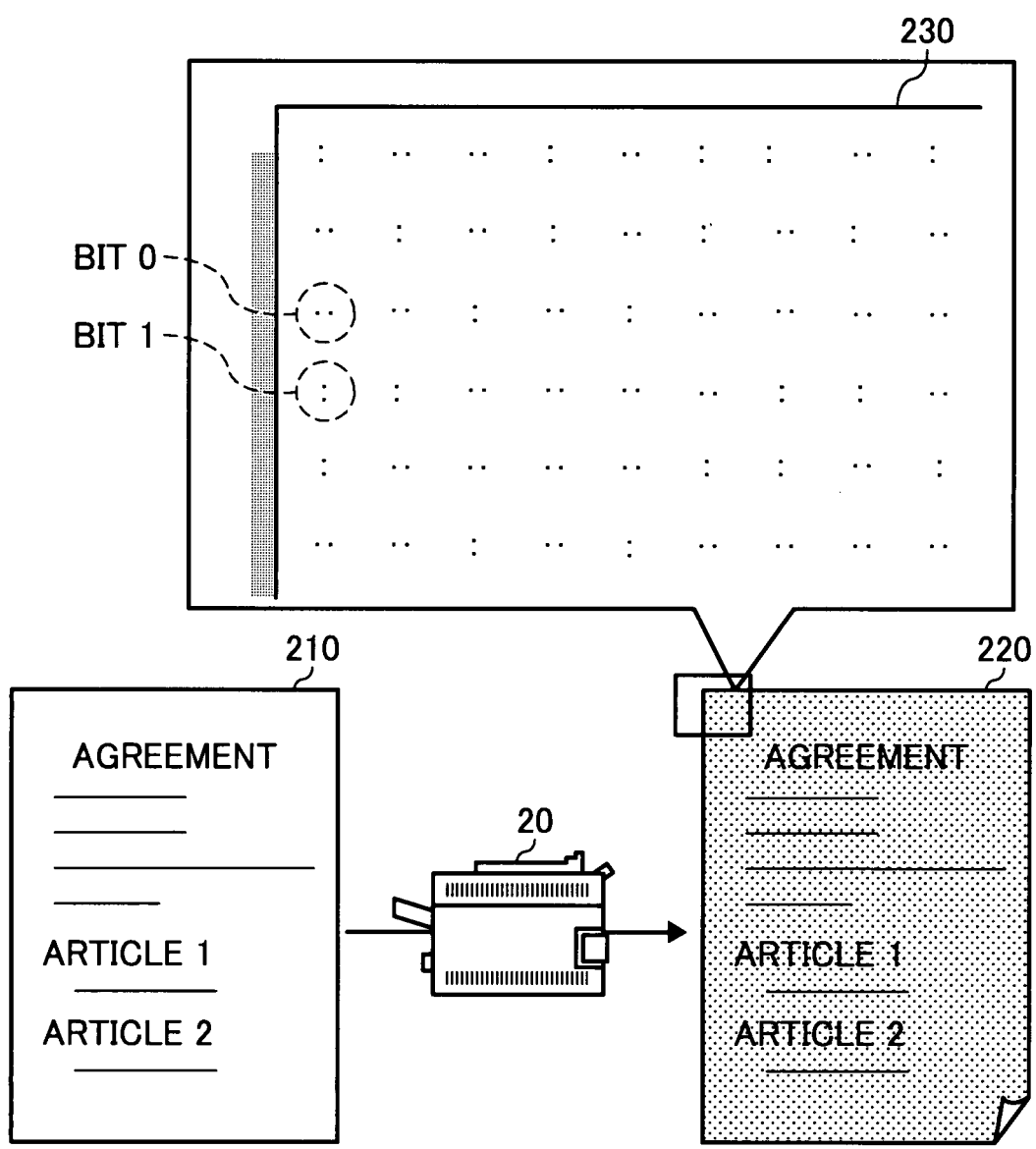
FIG. 3 illustrates examples of a processing target image and a media sheet having an information-added image printed thereon.

Next, a description is given of processes performed by the information processing apparatus. First, the processing-target-image acquisition unit 111 obtains a processing target image 210, i.e., a target image into which additional information is to be embedded. In FIG. 3, the processing target image 210 is shown as a written agreement. However, the processing target image 210 is, of course, not limited to such agreement but may be any other suitable image or piece of information. The processing target image 210 is obtained from the scanner unit of the multifunctional copier 20, for example. Alternatively, the processing target image 210 may be obtained through the communication unit from another apparatus via the network 40. Further, the processing target image 210 may be obtained from the HDD or using a word processing program or other application software.

The embed-information acquisition unit 112 obtains information to be embedded into the processing target image 210 (hereinafter, embed information). The embed information may be the creation date and time of the processing target image 210 or the digital image data thereof, the creator name of the processing target image 210, and/or the uniform resource locator (URL) of a site storing the digital image data. It should be noted that the embed information is not limited to the above-described examples but may be any other information suitable for the intended purpose.

The embed information may be obtained from the HDD of the PC 10. Alternatively, the embed information may be obtained through the input unit of the PC 10 or using a word processing program or other application software. Further, the embed information may be obtained from another apparatus via the network 30.

The control-information acquisition unit 113' obtains control information regarding authorization of access to the embed information. The control information is used to determine whether or not access to the embed information is authorized.

The converter 114 executes conversion processing on the control information obtained by the control-information acquisition unit 113. For example, the converter 114 converts the control information into a hash value using a hash function, which is a one-way function. Alternatively, the converter 114 may convert the control information using a public key according to public key encryption. Further, the converter 114 may convert the control information according to an electronic signature method.

For public key encryption, a plurality of pairs of public keys and corresponding private keys are prepared. The public keys are stored in a publicly accessible location, for example, a public-key server, so as to be available to the general public. A user may encrypt desired target information using one public key. The resultant encrypted information can be decrypted only by using the one corresponding private key paired with that public key. Therefore, only a person having the corresponding private key can view the content of encrypted information, thus providing a relatively high level of information security.

The electronic signature is an electromagnetic signature provided on an electronic document so as to be able to determine whether or not the electronic document has been undesirably altered. For an electronic signature method, a plurality of pairs of public keys and corresponding private keys are prepared similar to the above-described public key encryption, although the electronic signature method is different from the encryption in the manner of using the keys. For example, a user encrypts desired target information using one private key. The resultant encrypted information is decrypted only by using the one corresponding public key paired with that private key. Thus, a successful decryption of the encrypted information with the corresponding public key ensures that the information has been created by the user having the private key and has not been undesirably altered.

The above-described hash function for converting the control information may be obtained from the HDD of the PC 10. Further, the hash function, the public key according to the public key encryption, or the private key according to the electronic signature method may be obtained from another apparatus via the network 30. Alternatively, the hash function, the public key, or the private key may be obtained from a web site providing such function or key, or from a word processing program or other application software.

The encoder 115 encodes the embed information and the converted control information. The encoder 115 encodes the embed information and the converted control information as binary data expressed in bits 0 and 1, for example. The encoder 115 may encode the embed information and the converted control information according to a highly-efficient encoding method, a compression encoding method, or any other encoding method capable of encoding character and image information as a bit string. Additionally, the encoder 115 may encode the embed information and the encrypted control information using a given encoding method.

Figure 4:
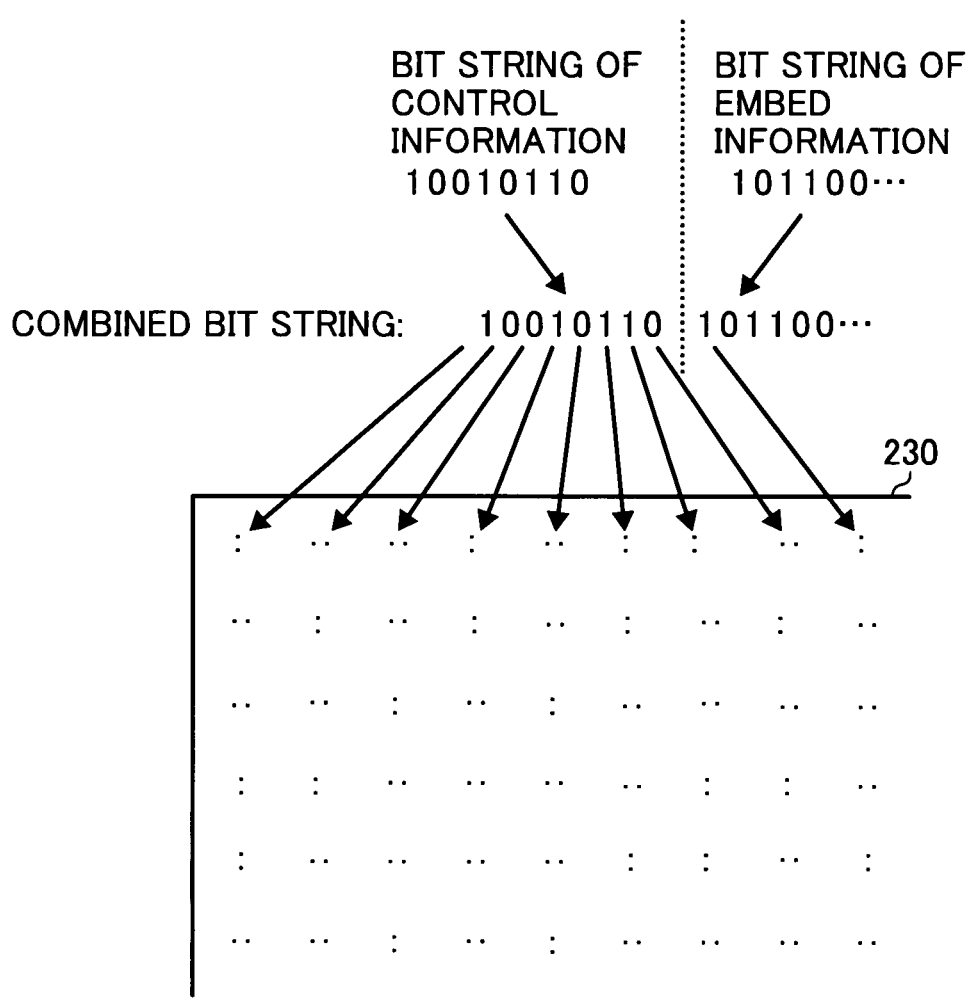
FIG. 4 illustrates a method of embedding control information and embed information according to an exemplary embodiment of the present invention.

The information embedder 116 generates, for example, a dot pattern 230 as illustrated in FIG. 3 from the embed information and converted control information encoded by the encoder 115. The information embedder 116 also adds the dot pattern 230 to the processing target image 210 and thus generates an information-added image 220 as illustrated in FIG. 3. The embed information and converted control information encoded by the encoder 115, that is, two bit strings are transformed into a dot pattern 230 according to a dot pattern format. For example, as illustrated in FIG. 4, bits of 0 and 1 may be transformed into "••" and ":", respectively.

In this exemplary embodiment, the arrangement of the dot pattern 230 is determined by a combined bit string of the control information and the embed information.

Alternatively, the arrangement of the dot pattern 230 may be determined by combining the control information and the embed information in a manner different from the above-described manner. Further, the arrangement of the dot pattern 230 may be determined by allocating the control information and the embed information to separate areas of the processing target image, or by repeating the control information and the embed information at constant intervals. The arrangement of the dot pattern 230 may be determined by arranging the control information and the embed information while adding identification information for distinguishing the two types of information.

Figure 5B:
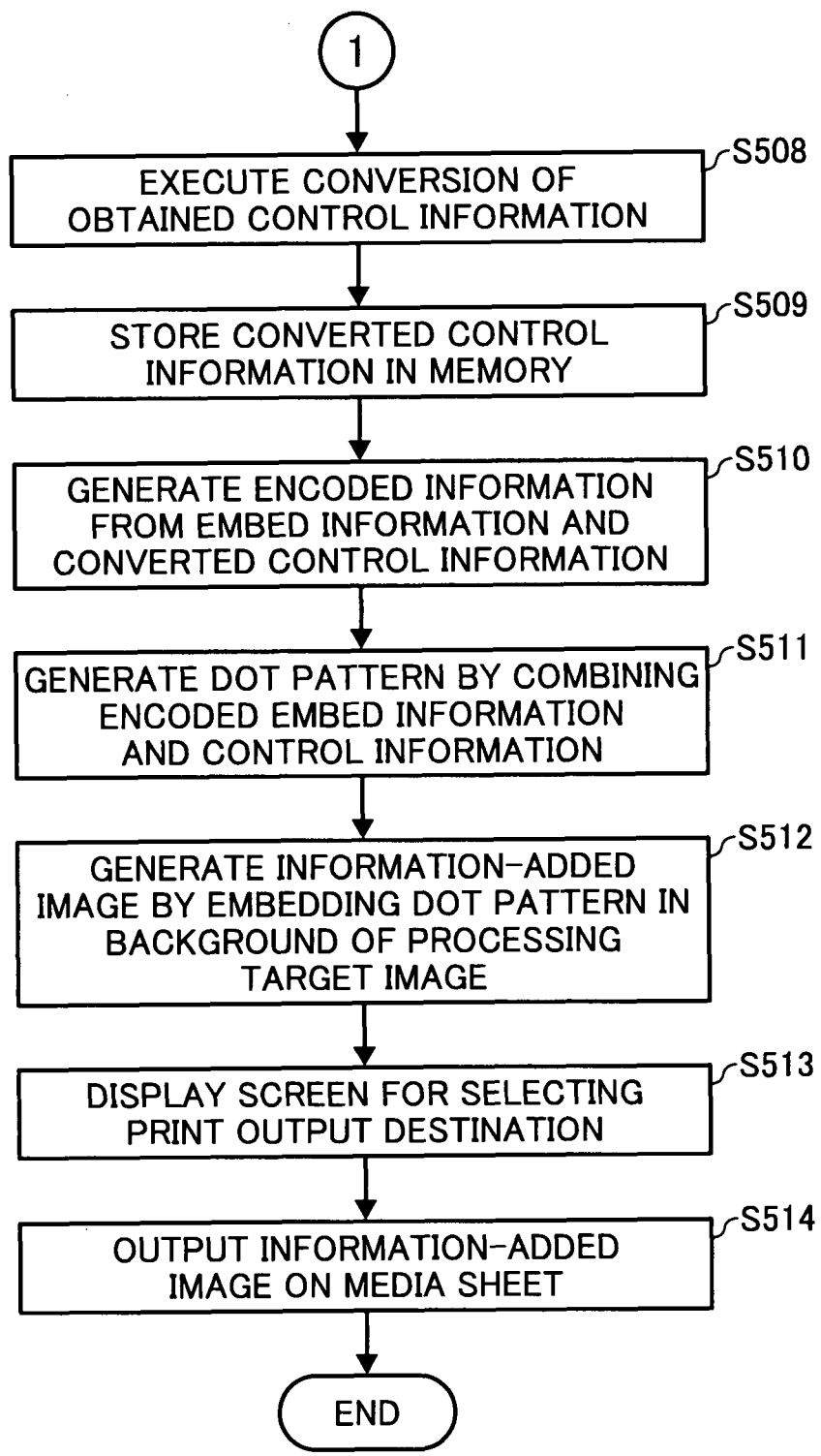

Next, a procedure for embedding the embed information and the converted control information into the processing target image is described with reference to flowcharts of FIGS. 5A and 5B.

Figure 6:
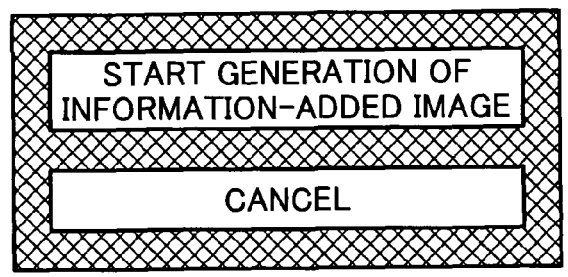
FIG. 6 is an illustration of a screen for starting generation of an information-added image.

At S501, a screen, as illustrated in FIG. 6, for starting generating an information-added image is displayed on the display of the PC 10. When the screen is displayed, a user can start obtaining the processing target image by selecting a start button as illustrated in FIG. 6. In this exemplary embodiment, the screen is configured as a touch panel screen capable of responding a touch operation of the user. Alternatively, the start of generation of information-added image may be selected by the user through the keyboard or a mouse, for example.

Figure 7:
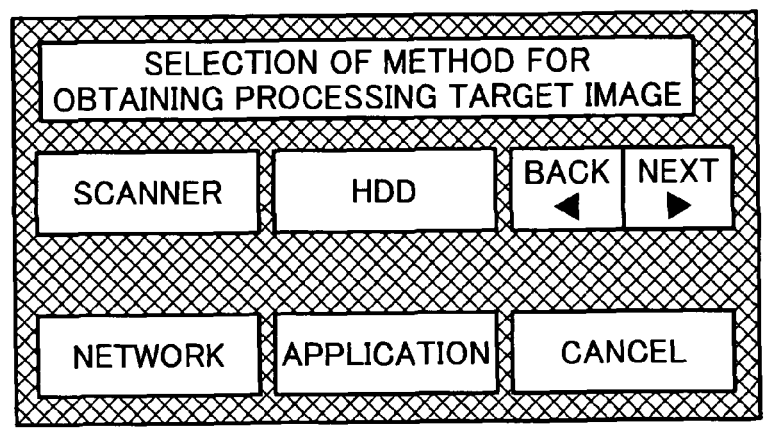
FIG. 7 is an illustration of a screen for selecting a method for obtaining a processing target image.

At S502, the processing-target-image acquisition unit 111 selects a method for obtaining the processing target image. On the display of the PC 10 is displayed a screen, as illustrated in FIG. 7, for selecting a method for obtaining the processing target image. When the screen is displayed, the user can start obtaining the processing target image by selecting a method displayed on the screen. As illustrated in FIG. 7, the screen may include selection buttons associated with the scanner unit, HDD, network, and application software.

Each button on the screen indicates a device or mechanism for obtaining a processing target image. For the scanner button, the processing target image can be obtained by converting analog image data on a media sheet into digital image data using the scanner unit or any other optical reading device. For the HDD button, the processing target image can be obtained from the HDD storing the target image as electronic data. For the network button, the processing target image can be obtained via a local area network (LAN) or the Internet. For the application button, the processing target image can be obtained using a word processing program or other application software.

At S503, the processing target image obtained at S502 is stored in memory. The processing target image obtained by the processing-target-image acquisition unit 111 is stored in a given memory area in the RAM or HDD of the PC 10, for example. The processing target image is stored with an identification code for distinguishing the target image from any other image.

Figure 8:
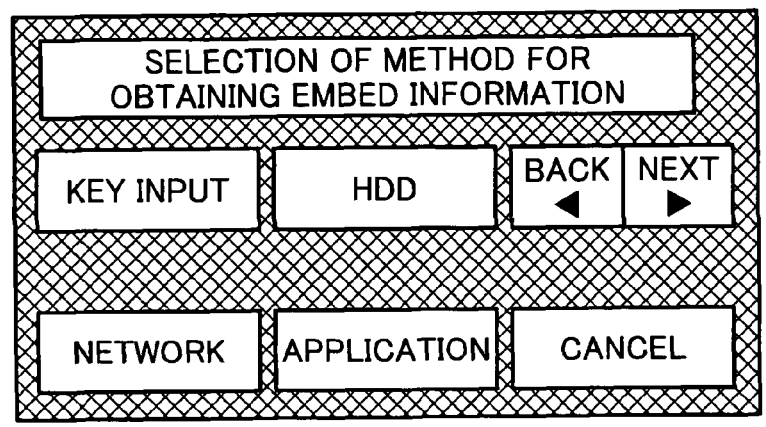
FIG. 8 is an illustration of a screen for selecting a method for obtaining embed information.

At S504, the embed-information acquisition unit 112 selects a method for obtaining information to be embedded into the processing target image. When a screen, as illustrated in FIG. 8, for selecting the method is displayed, the user can start obtaining the embed information by selecting a method displayed on the screen. As illustrated in FIG. 8, the screen may include selection buttons associated with the keyboard, HDD, network, and application software. The embed information may be obtained from the HDD, for example. Alternatively, the embed information may be input from the keyboard by the user. Further, the embed information may be obtained via the network or may be prepared using a word processing program or other application software.

At S505, the obtained embed information is stored in memory. The embed information obtained by the embed-information acquisition unit 112 is stored in a given memory area of the RAM or HDD of the PC 10, for example. Here, the embed information is stored with a code corresponding to the processing target image.

Figure 9:
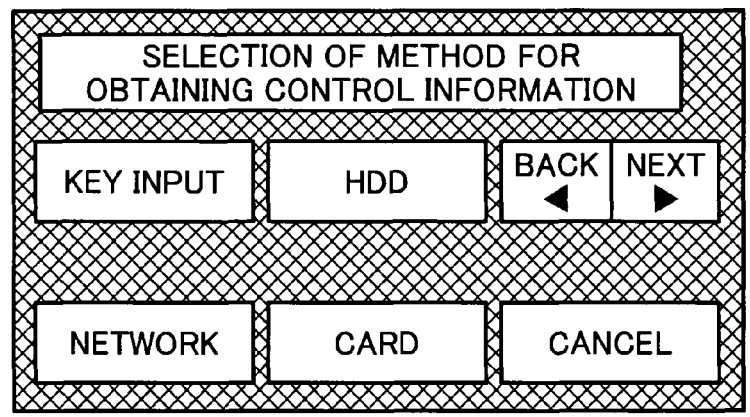
FIG. 9 is an illustration of a screen for selecting a method for obtaining control information.

At S506, the control-information acquisition unit 113 selects a method for obtaining control information. When a screen, as illustrated in FIG. 9, for selecting the method is displayed, a user can start obtaining the control information by selecting a method on the screen. As illustrated in FIG. 9, the screen may include selection buttons associated with the keyboard, HDD, network, and a card reader.

The control information is used to control authorization regarding the extraction of the embed information. For example, a password, a staff identification number, a section code, and/or any other suitable sort of information may be obtained as the control information. In this exemplary embodiment, the control information is assumed to be obtained from the card reader. Alternatively, the control information may be input from the keyboard by the user. Further, the control information may be obtained from the HDD or via the network.

At S507, the obtained control information is stored in memory. For example, the control information obtained by the control-information acquisition unit 113 is stored in a given memory area in the RAM or HDD of the PC 10. Here, the control information is stored with a code corresponding to the processing target image.

Figure 10:
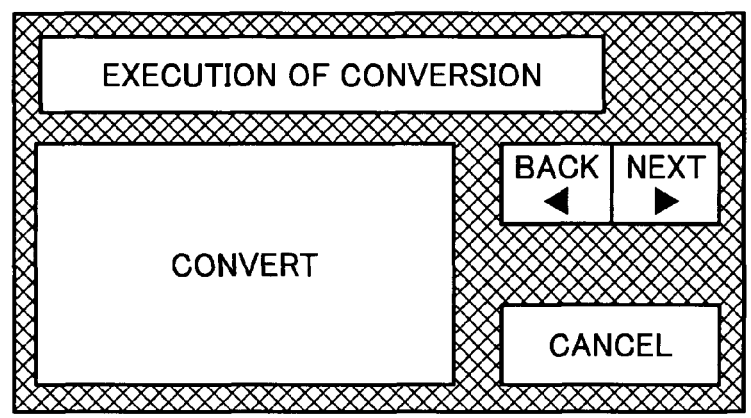
FIG. 10 is an illustration of a screen for selecting execution of conversion.

At S508, the converter 114 selects execution of conversion processing of the control information. When a screen, as illustrated in FIG. 10, for selecting the execution is displayed on the display, the user can start executing the conversion by selecting a button on the screen. The conversion may be executed using a hash function. Alternatively, the conversion may be executed according to the public key encryption or electronic signature methods described above.

For a conversion method using a hash function, a hash value can be easily calculated from original data while the inverse function thereof is quite difficult to calculate. For example, message digest 5 (MD5) or secure hash algorithm 1 (SHA-1) may be used as such a hash function. Such a hash function may be previously entered and incorporated into the conversion module so that the conversion is executed according to a conversion method selected by the user.

For public key encryption, target data is converted using one public key as described above. The public key may be downloaded from a website, and the URL thereof may be previously entered in the information processing apparatus. Alternatively, the public key may be previously stored in the HDD of the PC 10.

Further, for the electronic signature method, target data is converted using a private key, which may be stored in the HDD.

At S509, the converted control information is stored in memory. The converted control information obtained by the converter 114 is stored in a given memory area in the RAM or HDD of the PC 10, for example. Here, the embed information is stored with a code corresponding to the processing target image.

At S510, the encoder 115 encodes the embed information and the converted control information to generate encoded information. The embed information and the converted control information stored in the memory areas are encoded as, for example, binary data expressed by bit 0 or 1.

At S511, the information embedder 116 generates a dot pattern 230. For example, bits of 0 and 1 of the encoded bit data are converted into two types of image pattern "••" and ":" respectively, to generate the dot pattern 230. Alternatively, the information embedder 116 may generate a bar code, a two-dimensional bar code, or an electronic watermark from the encoded bit data. Such embed information may be embedded in a given location and a given number of times.

At S512, the information embedder 116 adds the generated dot pattern 230 to the processing target image 210 to generate an information added image. For example, the processing target image 210 as illustrated in FIG. 3 is read out from the memory area. The dot pattern 230 generated at S511 is added to the processing target image 210 to generate an information-added image 220 as illustrated in FIG. 3.

Figure 11:
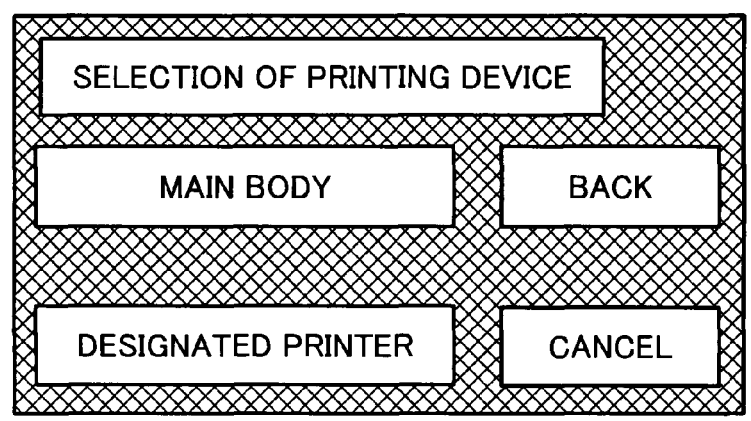
FIG. 11 is an illustration of a screen for selecting a printing device.

At S513, a print output destination for the information-added image 220 is selected. On the display of the information processing apparatus is displayed a screen, as illustrated in FIG. 11, for selecting a printing device. The user can specify one printing device by selecting a button on the screen. The screen allows the user to specify the printer unit of the information processing apparatus via a printer driver. Further, the screen allows the user to specify another printing device connected to a network. Such a plurality of print output destinations may be previously entered in the PC 10.

At S514, the information-added image is output to the destination selected from the PC 10. For example, the information-added image 220 is printed on a paper sheet or any other suitable recording medium, after which processing ends.

Next, a method for extracting information from a target image according to an exemplary embodiment of the present invention is described with reference to FIG. 12.

Figure 12:
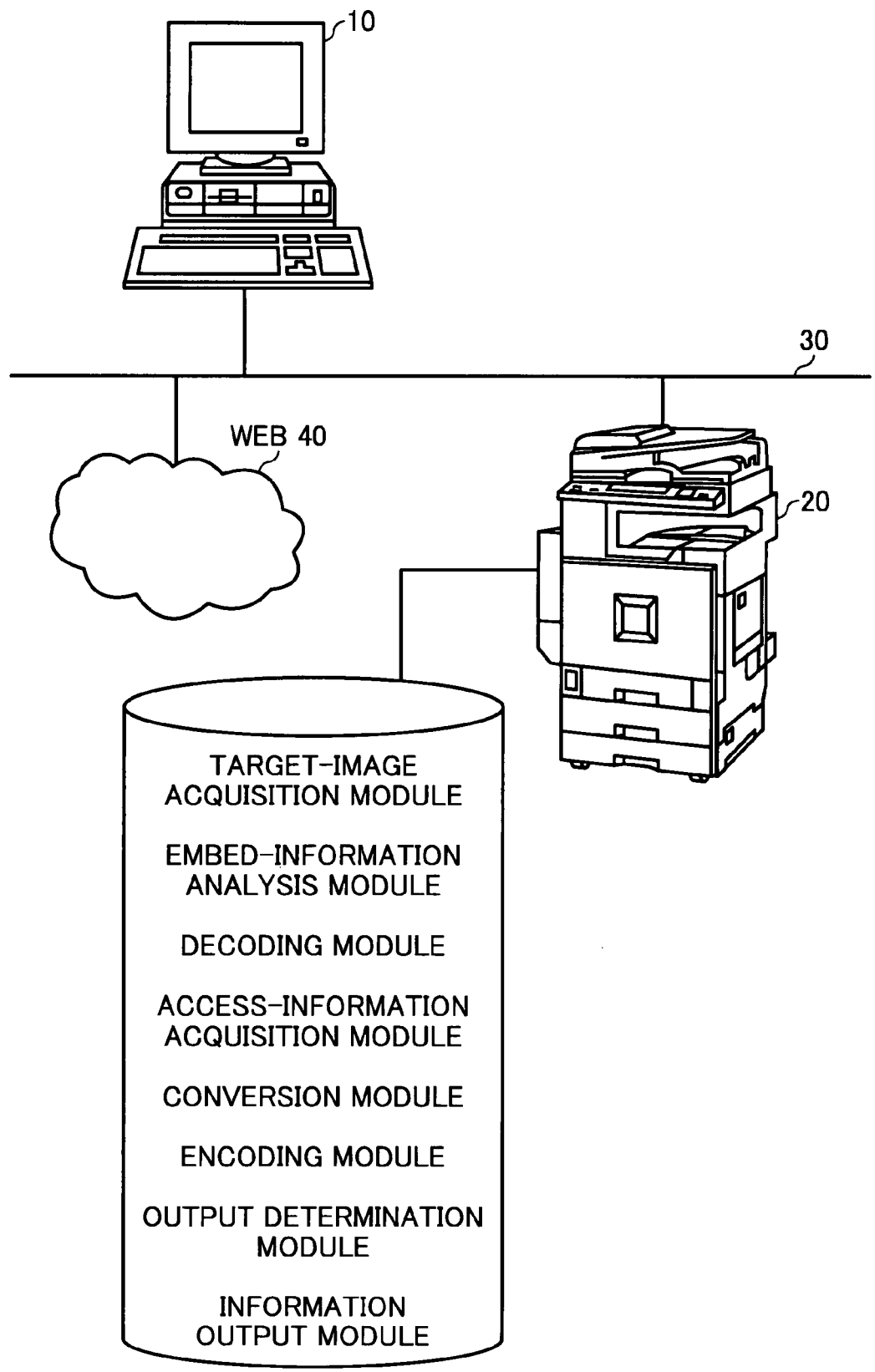
FIG. 12 illustrates a configuration of a system including an information processing apparatus according to an exemplary, embodiment of the present invention.

FIG. 12 illustrates a configuration of a system including an information processing apparatus capable of extracting information from a target image according to an exemplary embodiment of the present invention. In this exemplary embodiment, a PC 10 and a multi-functional copier 20 are configured as information processing apparatuses. In this system configuration, as illustrated in FIG. 12, the PC 10, the multi-functional copier 20, and a web 40 are connected to one another via a network 30.

The multi-functional copier 20, which is an example of an information processing apparatus, typically includes a scanner unit for reading an original document, a printer unit, a CPU, a ROM, a RAM, a HDD, an I/O unit, and a communication unit, which are not illustrated in FIG. 12.

Further, the information processing apparatus employs the CPU, if needed, in conjunction with another component, to execute an extraction-target-image acquisition module, an embed-information analysis module, a decoding module, an access-information acquisition module, a conversion module, an encoding module, an output determination module, and an information output module. Each module may be stored as a program in the HDD or on a removable storage medium, for example, a diskette or optical disk, in a distributable form.

The PC 10 typically includes a CPU, a ROM, a RAM, a HDD, an I/O unit, and a communication unit. As described above, the PC 10 is configured as an information processing apparatus according to an exemplary embodiment of the present invention. However, the information processing apparatus according to an exemplary embodiment of the present invention is not limited to the PC 10 or the multi-functional copier 20, but may be any other information processing apparatus capable of executing the above-described modules.

The network 30 allows the PC 10 and the multi-functional copier 20 to communicate with each other through the communication units. Further, the network 30 allows the PC 10 and the multi-functional copier 20 to communicate with other PCs via the web 40.

Figure 13:
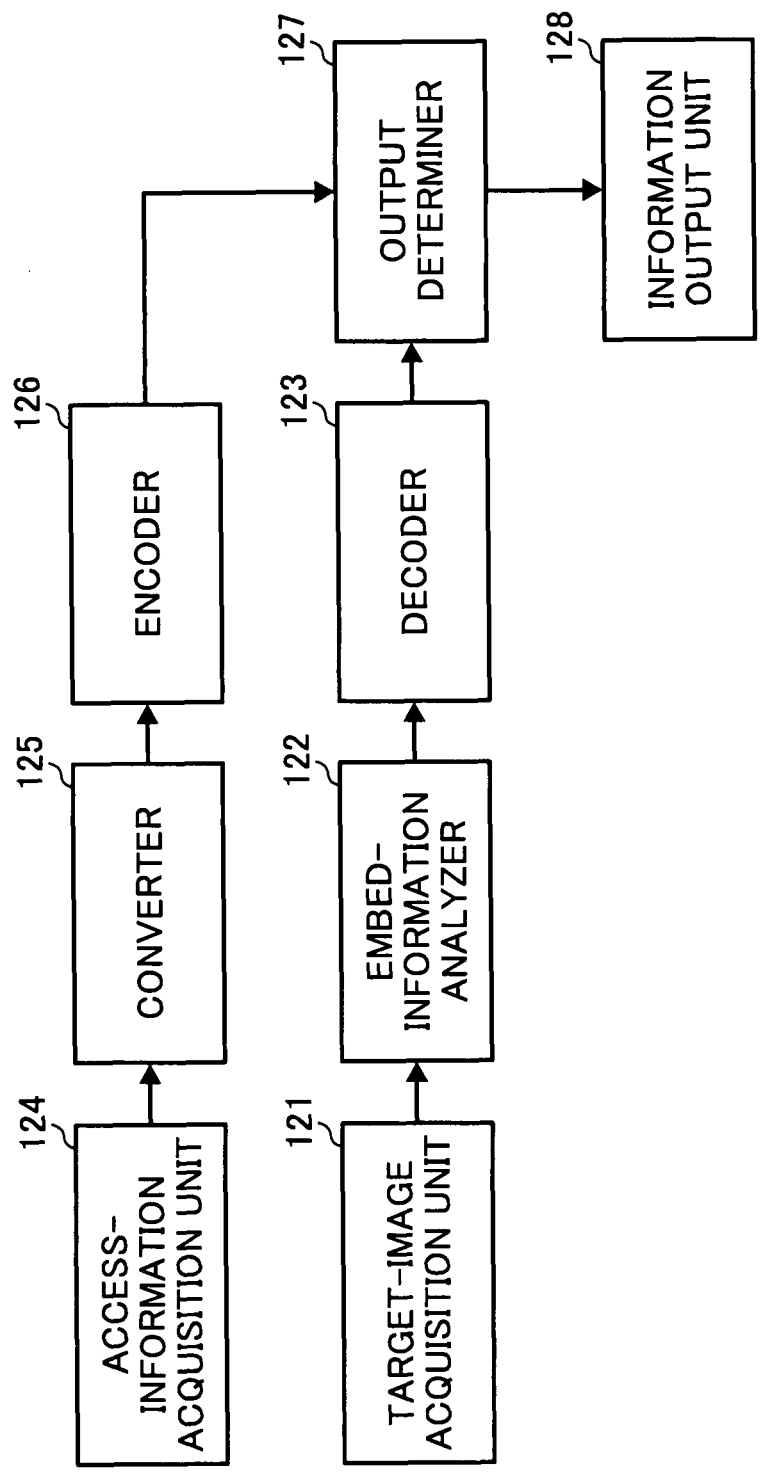
FIG. 13 is a functional block diagram of components employed when embed information is extracted in an information processing apparatus according to an exemplary embodiment of the present invention.

The extraction-target-image acquisition module, the embed-information analysis module, the decoding module, the access-information acquisition module, the conversion module, the encoding module, the output determination module, and the information output module of FIG. 12 correspond to an extraction-target-image acquisition unit 121, an embed-information analyzer 122, a decoder 123, an access-information acquisition unit 124, a converter 125, an encoder 126, an output determiner 127, and an information output unit 128, respectively, as illustrated in FIG. 13.

FIG. 13 is a functional block diagram of components employed when embed information is extracted in an information processing apparatus according to an exemplary embodiment of the present invention. As illustrated in FIG. 13, the information processing apparatus typically includes the extraction-target-image acquisition unit 121, the embed-information analyzer 122, the decoder 123, the access-information acquisition unit 124, the converter 125, the encoder 126, the output determiner 127, and the information output unit 128.

Figure 14:
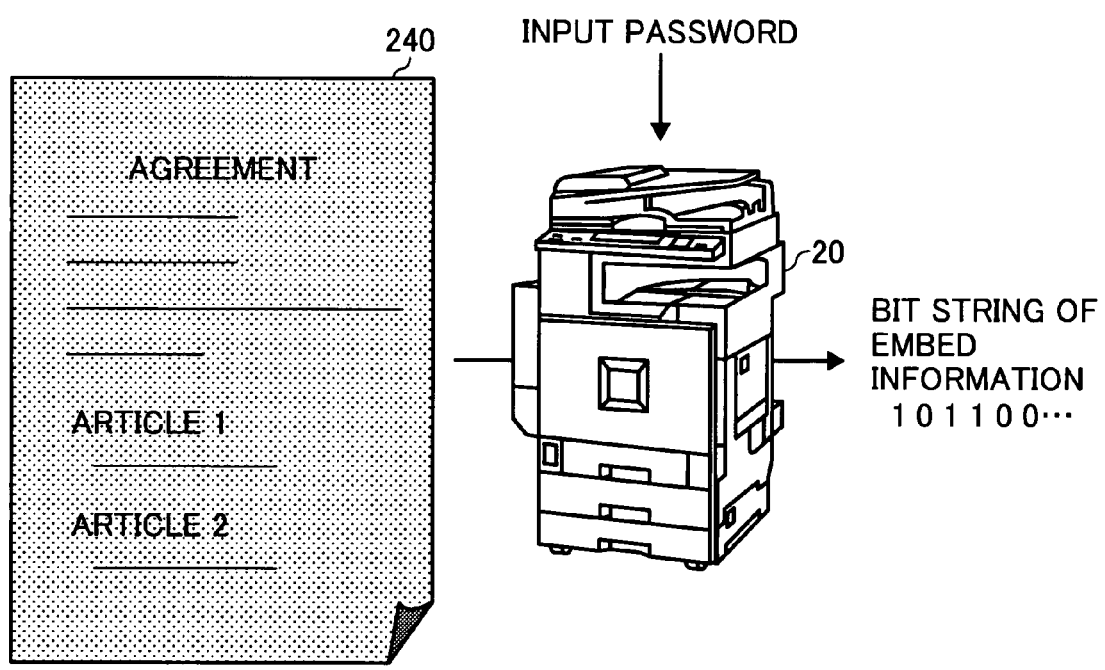
FIG. 14 illustrates an example of extraction processing according to an exemplary embodiment of the present invention.

Next, processes performed by the information processing apparatus are described with reference to FIG. 13. First, the extraction-target-image acquisition unit 121 obtains an extraction target image 240, which is an image including embed information to be extracted. The extraction target image 240 may be an agreement as illustrated in FIG. 14 or any other suitable image or information. The extraction target image 240 may be obtained from the scanner unit of the multi-functional copier 20. Alternatively, the extraction target image 240 may be obtained through the communication unit from another apparatus via a network or a public line. Further, the extraction target image 240 may be obtained from the HDD.

The embed-information analyzer 122 extracts an embedded image from the extraction target image 240 obtained by the extraction-target-image acquisition unit 121 and divides the embedded image into an embed information section and a control information section. The extraction target image 240 includes a processing target image 210 and a dot pattern 230. The extraction-target-image acquisition unit 121 extracts the dot pattern 230, which is the embedded image, from the extraction target image 240.

In one extraction method, the extraction target image 240 is recognized by an optical character reader (OCR) as a group of image patterns "••" and/or ":" to generate a dot pattern 230. Alternatively, the extraction target image 240 may be recognized by any suitable processing other than OCR processing.

The extracted dot pattern 230 is divided into an embed information section and a control information section. In one dividing method, the dot pattern 230 may be divided so that the first eight dots from the leading dot of the dot pattern 230 are classified into the control information section, while the following dots thereof are classified into the embed information section. Alternatively, separate portions of the dot pattern 230 may be previously designated as the control information section and the embed information section by the information embedder 116. Further, the dot pattern 230 may be divided based on identification codes added to the control information and the embed information. The dot pattern 230 may be divided using a method corresponding to a method for adding the embed information used by the information embedder 116.

The decoder 123 decodes the control information section and the embed information section divided by the embed-information analyzer 122. In one decoding method, the image patterns "••" and ":" are converted to bits of 0 and 1, respectively, to generate respective bit strings of the control information section and the embed information section.

Such decoding may be executed when the embed-information analyzer 122 extracts the image patterns "••" and ":", and the decoded bit strings may be divided into the control information section and the embed information section.

The access-information acquisition unit 124 obtains access information used to determine whether or not access to the embed information in a printed document should be authorized. The access information corresponds to the information set as the control information. The access information may be obtained from the input unit of the multi-functional copier 20. Alternatively, any suitable information, for example, a password or a staff code, may be read as the access information from a contact integrated circuit (IC) card or a non-contact IC card into the card reader. Further, the access information may be obtained through the communication unit from another apparatus via a network or a public line. Alternatively, the access information may be obtained from the HDD.

The converter 125 converts the access information obtained by the access-information acquisition unit 124. The conversion is executed according to a method corresponding to a method used in converting the control information. In one conversion method, the converter 125 may use a hash function, which is a one-way function, to convert the access information into a hash value.

Alternatively, in another conversion method, the control information section obtained by the embed-information analyzer 122 may be decoded using a private key according to public key encryption. Further, the control information may be decoded using a public key according to an electronic signature method.

Such a hash function, private key, or public key may be obtained from the HDD, or from another apparatus via the network.

The encoder 126 encodes the access information converted by the converter 125. The encoder 126 encodes the access information using a method corresponding to a method used in encoding the control information. The access information may be encoded as binary data, for example. Alternatively, the access information may be encoded according to a high-efficient encoding method or a compression encoding method. Further, the access information may be encoded according to any other encoding method capable of expressing characters or images as bit strings.

The output determiner 127 compares the access information encoded by the encoder 126 with the bit information of the control information section extracted by the decoder 123 and determines whether or not the two pieces of information match each other. In one comparison method, the access information encoded by the encoder 126 is compared with the bit string of the control information section decoded by the decoder 123 to determine whether or not access to the embed information should be authorized. In another exemplary embodiment, the bit string of the control information section may include authorization information of a plurality of users. In such a case, the authorization information of the plurality of users may be compared in turn with the encoded access information to determine access authorization.

If the output determiner 127 determines that the access information encoded by the encoder 126 matches the dot pattern information of the control information section decoded by the decoder 123, the information output unit 128 outputs the embed information. On the other hand, if the output determiner 127 determines that the two pieces of information do not match each other, an alert notice is output to the information processing apparatus.

Figure 15B:
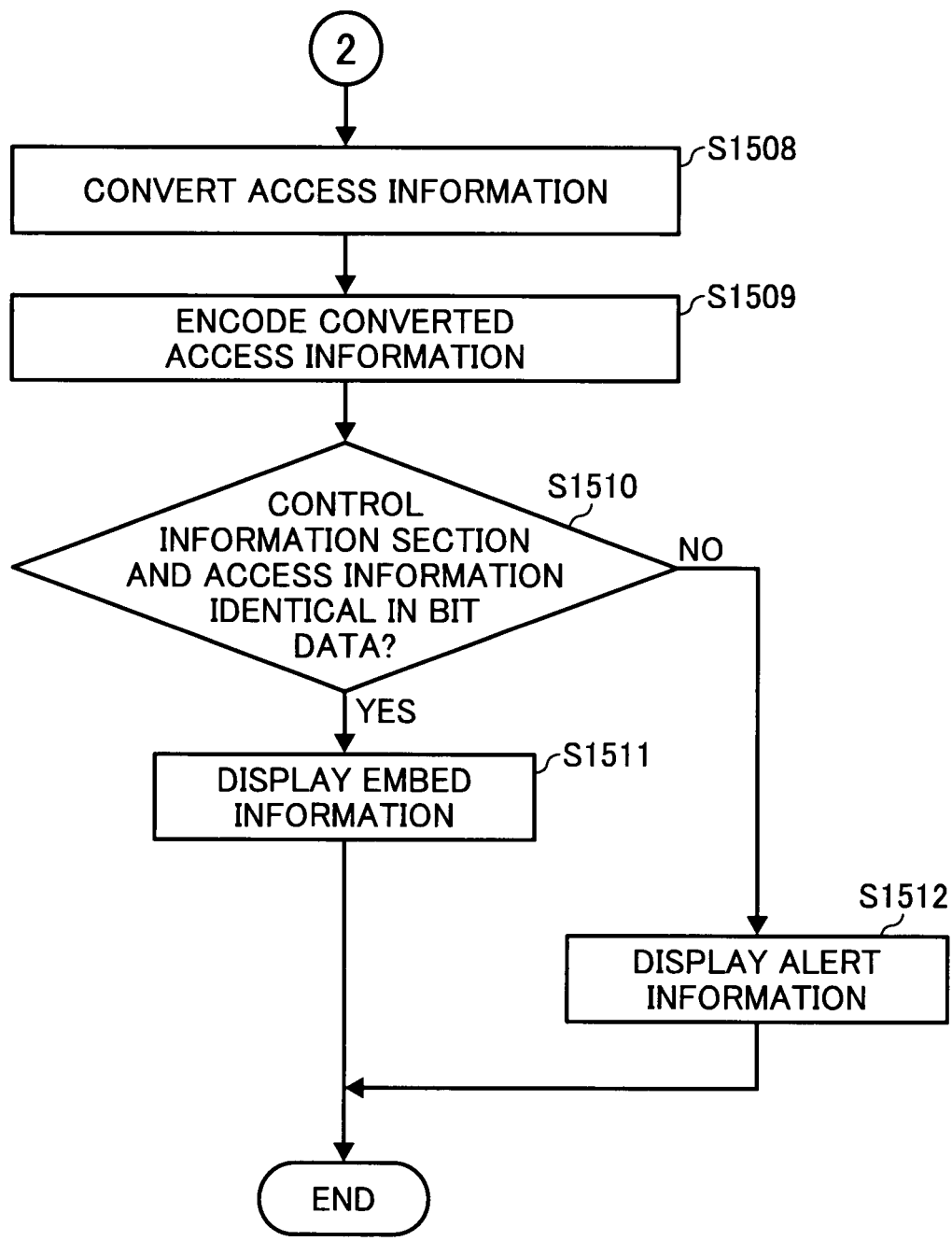

Next, a procedure, according to an exemplary embodiment of the present invention, for receiving authorization to extract embed information from a target image and extracting the embed information is described with reference to flowcharts of FIGS. 15A and 15B.

Figure 16:
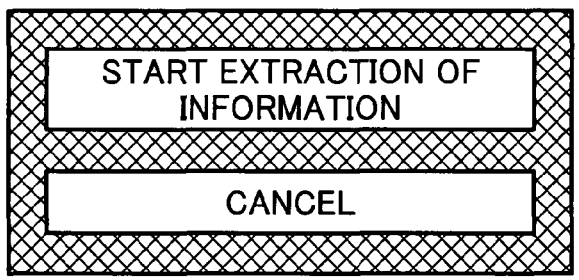
FIG. 16 is an illustration of a screen for starting extraction of information.

At S1501, a screen, as illustrated in FIG. 16, for starting extraction of embed information is displayed on the display of the multi-functional copier 20. A user can start the extraction by selecting a start button as illustrated in FIG. 16. In this exemplary embodiment, the screen is configured as a touch panel screen capable of responding to a touch operation of the user. Alternatively, the start of extraction may be selected by the user through the keyboard or a mouse, for example.

Figure 17:
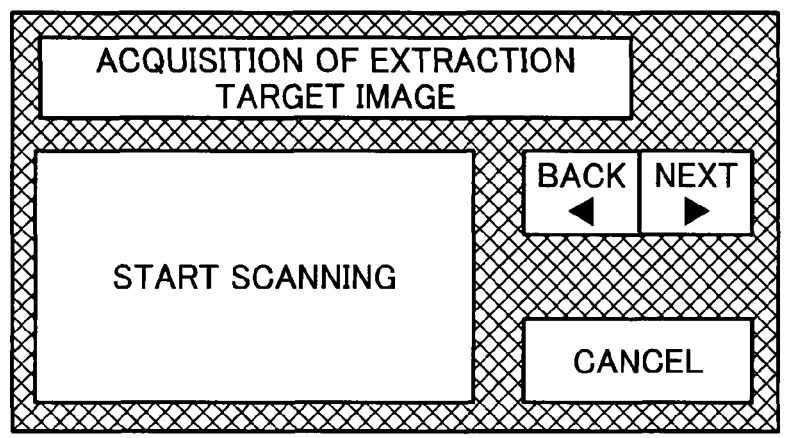
FIG. 17 is an illustration of a screen for selecting a method for obtaining an extraction target image.

At S1502, the extraction-target-image acquisition unit 121 displays a screen, as illustrated in FIG. 17, for starting acquisition of an extraction target image. When the screen is displayed, the user can start obtaining the extraction target image. As illustrated in FIG. 17, the target image may be obtained by the scanner unit or any other scanning device, in which case analog image data on a media sheet is converted into electronic data through an optical reading section thereof.

At S1503, the obtained extraction target image is stored in memory. For example, the extraction-target-image acquisition unit 121 stores the extraction target image in a given memory area in the RAM or HDD of the multi-functional copier 20. The extraction target image obtained at S1502 is stored with a code for distinguishing the target image from any other image.

At S1504, the embed-information analyzer 122 extracts a dot pattern from the extraction target image. In, this exemplary embodiment, two types of dot patterns "••" and ":" are extracted from the extraction target image stored at S1503. It should be noted that the extracted information is not limited to the dot patterns but may be a bar code, a two-dimensional bar code, or an electronic watermark, for example.

At S1505, the extracted dot pattern is divided into an embed information section and a control information section. In the dot pattern extracted at S1504, the embed information section and the control information section are arranged in a manner previously defined by the information embedder 115, according to which the embed-information analyzer 122 divides the dot pattern into the embed information section and the control information section.

At S1506, the decoder 123 decodes respective dot patterns of the embed information section and the control information section. Each of the embed information section and the control information section is formed by the two types of dot patterns "••" and ":" The decoder 123 generates bit strings from the dot patterns according to a conversion method corresponding to a conversion method used by the information acquisition unit 116. Thus, the two types of dot patterns "••" and ":" are converted into bits of 0 and 1, respectively.

Figure 18:
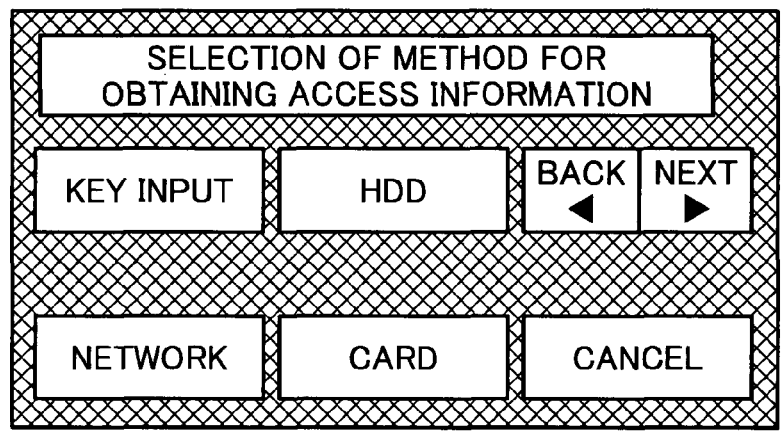
FIG. 18 is an illustration of a screen for selecting a method for obtaining access information.

At S1507, the access-information acquisition unit 124 displays, on an operation panel, a screen as illustrated in FIG. 18 for selecting a method for obtaining access information. When the screen is displayed, the user can start obtaining access information by selecting one method displayed on the screen. The access information corresponds to the control information of the extraction target image. As illustrated in FIG. 18, the screen may include selection buttons associated with the keyboard, HDD, network, and card reader. For example, by selecting the button labeled "keyboard", the user can input the access information from the keyboard.

For public key encryption, the control information and one private key are obtained as the access information. For an electronic signature method, one public key is obtained as the access information. Alternatively, suitable information, for example, a password or a staff code, recorded in a contact integrated circuit (IC) card or non-contact IC card may be read as the access information from the card reader. Further, the access information may be obtained through the communication unit from another apparatus via a network or a public line. Alternatively, the access information may be obtained from the HDD.

At S1508, the converter 125 executes conversion processing on the access information obtained at S1507. The converter 125 executes the conversion according to a method corresponding to the method used to generate the information-added image. The conversion may be executed using a hash function, for example, MD5 or SHA-1.

For public-key encryption, the control information section divided by the embed-information analyzer 122 is decoded using a private key. By contrast, in the electronic signature method the control information section is decoded using a public key.

At S1509, the encoder 126 encodes the access information converted at S1508. The converted access information is encoded as binary data expressed by bit 0 or 1.

At S1510, the output determiner 127 compares the bit string of the access information encoded at S1509 with the bit string of the control information section decoded at S1506. In one comparison method, authorization may be performed by determining whether or not the two bit strings match each other. Alternatively, for public-key encryption or electronic signature, authorization is performed by determining whether or not the decoded control information and the access information match each other.

Figure 19:
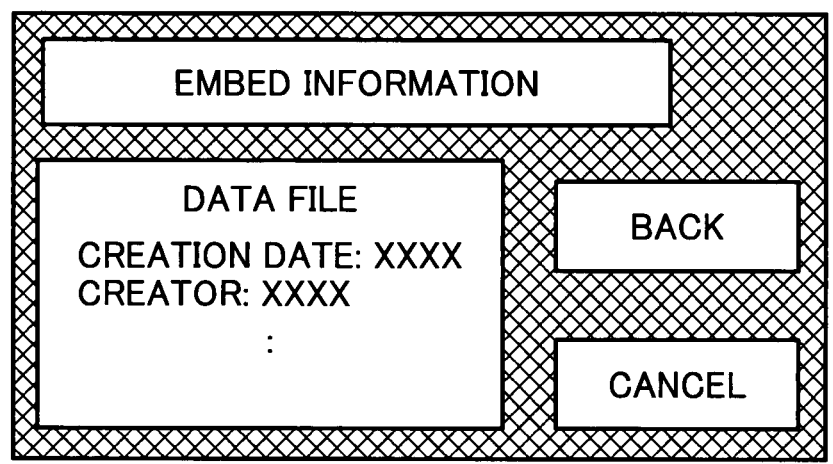
FIG. 19 is an illustration of a screen for displaying extracted embed information.

If the output determiner 127 determines that the two pieces of information match each other ("YES" at S1510), at S1511 the information output unit 128 authorizes outputting the embed information. The embed information is displayed on a screen, as illustrated in FIG. 19, for displaying extracted embed information. The embed information displayed on the screen may be electronic data of the processing target image, for example. With the output permission, the embed information may be displayed on the screen or printed onto a paper sheet or any other suitable recording medium. Further, the embed information may be stored in an electronic data file and processed by suitable application software.

Figure 20:
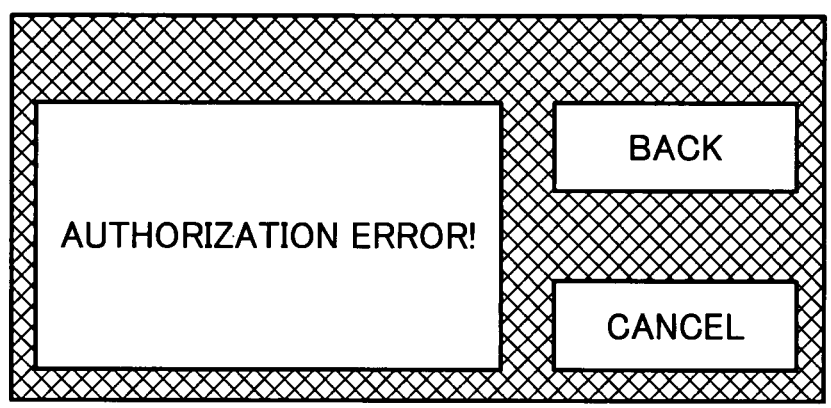
FIG. 20 is an illustration of a screen for displaying authorization error information.

Alternatively, if the output determiner 127 determines that the two pieces of information do not match each other ("NO" at S1510), then at S1512 the information output unit 128 prohibits outputting the embed information and displays an alert. In this case, authorization error information as illustrated in FIG. 20 is displayed on the display and processing ends. Alternatively, such authorization error information may be, for example, an alarm message, a warning beep, or an operation for preventing output such as forced termination of the extraction process.

Exemplary embodiments of the present invention may be conveniently implemented using a conventional general purpose digital computer programmed according to the teachings of the present specification, as will be apparent to those skilled in the computer art. Appropriate software coding can readily be prepared by skilled programmers based on the teachings of the present invention, as will be apparent to those skilled in the software art. Exemplary embodiments of the present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this application may be practiced otherwise than as specifically described herein.

Further, elements and/or features of different exemplary embodiments and/or examples may be combined with each other and/or substituted for each other within the scope of this disclosure and appended claims.

Still further, any one of the above-described and other exemplary features of the present invention may be embodied in the form of an apparatus, method, system, computer program or computer program product. For example, the aforementioned methods may be embodied in the form of a system or device, including, but not limited to, any of the structures for performing the methodology illustrated in the drawings.

Even further, any of the aforementioned methods may be embodied in the form of a program. The program may be stored on a computer readable medium and configured to perform any one of the aforementioned methods when run on a computer device (a device including a processor). Thus, the storage medium or computer readable medium can be configured to store information and interact with a data processing facility or computer device to perform the method of any of the above-described embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media (such as CD-ROMs and DVDs), magneto-optical storage media (such as MOs), magnetic storage media (including but not limited to floppy diskettes, cassette tapes, and removable hard disks), media with a built-in rewriteable non-volatile memory (including but not limited to memory cards), and media with a built-in ROM (including but not limited to ROM cassettes), etc. Furthermore, various information regarding stored images, for example, property information, may be stored in any other form, or provided in other ways.

Examples and embodiments being thus described, it should be apparent to one skilled in the art after reading this disclosure that the examples and embodiments may be varied in many ways. Such variations are not to be regarded as a departure from the spirit and scope of the present invention, and such modifications are not excluded from the scope of the following claims.

What is claimed is:

1. An information processing apparatus, comprising:
a first information acquisition unit configured to obtain target information;
a second information acquisition unit configured to obtain given information to be embedded in the target information;
a selection-screen display unit configured to display a screen for selecting one of a plurality of methods for obtaining control information to be embedded in the target information and accept a user selection indicating the method selected for obtaining the control information, the control information for authorizing access to the given information obtained by the second information acquisition unit;
a third information acquisition unit configured to obtain the control information according to the accepted user selection indicating the method selected by the selection-screen display unit; and
an information embedder configured to generate embed information from the given information obtained by the second information acquisition unit and the control information, and add identifying information to the embed information to distinguish the given information from the control information,
wherein the information embedder is further configured to separately arrange the given information and the control information in a predetermined pattern in the embed information, and generate an information-added image by embedding the embed information in the target information.

2. The information processing apparatus according to claim 1, further comprising a converter configured to convert the control information, obtained by the third information acquisition unit, using a one-way function,
wherein the information embedder generates the embed information from the given information obtained by the second information acquisition unit and the converted control information.

3. The information processing apparatus according to claim 1, further comprising a converter configured to convert the control information, obtained by the third information acquisition unit, using public key encryption,
wherein the information embedder generates the embed information from the given information obtained by the second information acquisition unit and the converted control information.

4. The information processing apparatus according to claim 1, further comprising a printing device configured to output the target information having the embed information embedded therein to a recording medium.

5. The information processing apparatus according to claim 1, further comprising:
a fourth information acquisition unit configured to obtain target information having embed information embedded therein, the embed information including given information obtained by the second information acquisition unit and control information for authorizing access to the given information obtained by the second information acquisition unit;
an information extractor configured to extract the embed information from the target information, obtained by the fourth information acquisition unit, and extract the control information from the embed information;
a fifth information acquisition unit configured to obtain access information for receiving authorization of an access to the given information obtained by the second information acquisition unit;
an output determiner configured to determine whether or not output of the given information obtained by the second information acquisition unit is authorized; and
an information output unit configured to output the given information obtained by the second information acquisition unit from the target information when the output determiner determines that output of the given information obtained by the second information acquisition unit is authorized.

6. The information processing apparatus according to claim 5, further comprising a converter configured to convert the access information, obtained by the fifth information acquisition unit, using a method corresponding to a method used in converting the control information.

7. The information processing apparatus according to claim 5, further comprising an alerting device configured to provide an alert when the output determiner determines that output of the given information obtained by the second information acquisition unit is not authorized.

8. An information processing method comprising the steps of:
   obtaining target information;
   obtaining given information to be embedded in the target information;
   displaying a selection-screen for selecting one of a plurality of methods for obtaining control information to be embedded in the target information, the control information for authorizing access to the given information embedded in the target information;
   accepting a user selection indicating the selected method for obtaining the control information;
   obtaining control information according to the accepted user selection indicating the selected method;
   generating embed information from the given information to be embedded in the target information and the control information;
   adding identifying information to the embed information to distinguish the given information from the control information;
   separately arranging the given information and the control information in a predetermined pattern in the embed information; and
   generating an information-added image by embedding the embed information in the target information.

9. The information processing method according to claim 8, further comprising the step of converting the control information using a one-way function,
   wherein the generating step generates the embed information from the given information to be embedded in the target information and the converted control information.

10. The information processing method according to claim 8, further comprising the step of converting the control information using public key encryption,
    wherein the generating step generates the embed information from the given information to be embedded in the target information and the converted control information.

11. The information processing method according to claim 8, further comprising the step of outputting the target information having the embed information embedded therein to a recording medium.

12. The information processing method according to claim 8, further comprising the steps of:
    obtaining target information having embed information embedded therein, the embed information including the given information and the control information for authorizing access to the given information;
    extracting the embed information from the target information;
    extracting the control information from the embed information;
    obtaining access information for receiving authorization of an access to the given information embedded in the target information;
    determining, based on the control information and the access information, whether or not output of the given information embedded in the target information is authorized; and
    outputting the given information from the target information whenever the determining step determines that output of the given information embedded in the target information is authorized.

13. The information processing method according to claim 12, further comprising the step of converting the access information using a method corresponding to a method used in converting the control information.

14. The information processing method according to claim 12, further comprising the step of outputting an alert whenever the determining step determines that output of the given information embedded in the target information is not authorized.

15. A non-transitory computer-readable storage medium storing a computer program that causes a computer to execute a method of:
    obtaining target information;
    obtaining given information to be embedded in the target information;
    displaying a selection-screen for selecting one of a plurality of methods for obtaining control information to be embedded in the target information, the control information for authorizing access to the given information embedded in the target information;
    accepting a user selection indicating the selected method for obtaining the control information;
    obtaining control information according to the accepted user selection indicating the selected method;
    generating embed information from the given information to be embedded in the target information and the control information;
    adding identifying information to the embed information to distinguish the given information from the control information;
    separately arranging the given information and the control information in a predetermined pattern in the embed information; and
    generating an information-added image by embedding the embed information in the target information.

16. The non-transitory computer-readable storage medium according to claim 15, wherein the method further comprises:
    obtaining target information having embed information embedded therein, the embed information including the given information and the control information for authorizing access to the given information;
    extracting the embed information from the target information;
    extracting the control information from the embed information;
    obtaining access information for receiving authorization of an access to the given information embedded in the target information;
    determining, based on the control information and the access information, whether or not output of the given information embedded in the target information is authorized; and
    outputting the given information from the target information whenever the determining step determines that output of the given information embedded in the target information is authorized.

17. The non-transitory computer-readable storage medium according to claim 16, wherein the method further comprises converting the access information using a method corresponding to a method used in converting the control information.

18. The non-transitory computer-readable storage medium according to claim 16, wherein the method further comprises outputting an alert whenever the determining step determines that output of the given information embedded in the target information is not authorized.

* * * * *